(12) United States Patent
Mary et al.

(10) Patent No.: US 9,122,007 B2
(45) Date of Patent: Sep. 1, 2015

(54) NANOSTRUCTURED SPECTRAL FILTER AND IMAGE SENSOR

(75) Inventors: Alexandre Mary, Sassenage (FR); Yohan Desieres, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 1123 days.

(21) Appl. No.: 13/061,935

(22) PCT Filed: Sep. 9, 2009

(86) PCT No.: PCT/EP2009/061673
§ 371 (c)(1),
(2), (4) Date: May 25, 2011

(87) PCT Pub. No.: WO2010/029097
PCT Pub. Date: Mar. 18, 2010

(65) Prior Publication Data
US 2011/0216229 A1 Sep. 8, 2011

(30) Foreign Application Priority Data

Sep. 11, 2008 (FR) ..................................... 08 56103

(51) Int. Cl.
*G02B 5/18* (2006.01)
*G02B 5/20* (2006.01)
*B82Y 20/00* (2011.01)

(52) U.S. Cl.
CPC ............... *G02B 5/1809* (2013.01); *B82Y 20/00* (2013.01); *G02B 5/201* (2013.01); *G02B 2207/101* (2013.01)

(58) Field of Classification Search
CPC ................. G02B 5/201; G02B 5/1809; G02B 2207/101; B82Y 20/00
USPC ..................................... 348/272–280
See application file for complete search history.

(56) References Cited

U.S. PATENT DOCUMENTS 6,057,586 A * 5/2000 Bawolek et al. .............. 257/435
7,166,797 B1 1/2007 Dziendziel et al.
(Continued)

FOREIGN PATENT DOCUMENTS

EP 0 807 846 A2 11/1997
EP 0 992 833 A2 4/2000
(Continued)

OTHER PUBLICATIONS

Bräuer, et al. 1994. Design of antireflection gratings with approximate and rigorous methods. *Applied Optics*, 33(34):7875-7882.
(Continued)

*Primary Examiner* — Nelson D. Hernández Hernández
(74) *Attorney, Agent, or Firm* — Knobbe, Martens, Olson & Bear LLP

(57) ABSTRACT

A spectral filter (150.1-150.4) comprising at least one metallic layer (101) structured by at least one hole (250.1-250.4) passing through two opposite mains faces of the metallic layer and comprising, in a plane parallel to a plane of one of the two main faces, a first rectangular section whereof a first side has a dimension between around 40 nm and 100 nm, and whereof a second side, perpendicular to the first side, has a dimension between around 150 nm and 1000 nm, and a second rectangular section centered relative to the first rectangular section, a first side of the second section being parallel to the second side of the first section and having a dimension between around 40 nm and 100 nm.

18 Claims, 6 Drawing Sheets

(56) References Cited

U.S. PATENT DOCUMENTS

Figure 1A:
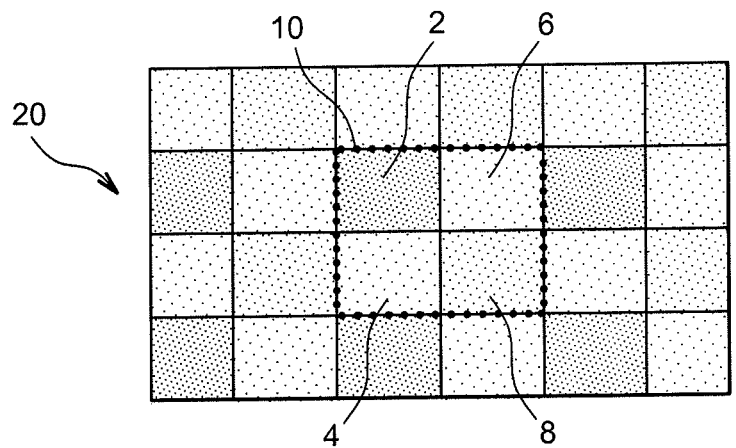

| | | |
|---|---|---|
| 2003/0103150 A1 | 6/2003 | Catrysse et al. |
| 2005/0153105 A1 | 7/2005 | Shimmo et al. |
| 2006/0007791 A1 | 1/2006 | Bamdad |
| 2006/0273245 A1 | 12/2006 | Kim et al. |

FOREIGN PATENT DOCUMENTS

| | | |
|---|---|---|
| EP | 1 416 303 A2 | 5/2004 |
| GB | 722749 | 1/1955 |
| WO | WO 2005/038501 A1 | 4/2005 |
| WO | WO 2006/010133 | 1/2006 |
| WO | WO 2007/118895 | 10/2007 |
| WO | WO 2010/029097 | 3/2010 |

OTHER PUBLICATIONS

Schmitz, et al. 1995. Phase gratings with subwavelength structures. *Journal of the Optical Society of America*, 12(11):2458-2462.

Preliminary Search Report from FR 0856103, dated Jun. 9, 2009.

Barnes W. L. et al., "Surface plasmon subwavelength optics", Nature, Nature Publishing Group, London, UK, vol. 424, Aug. 14, 2003, p. 824-830.

Degiron A. et al., Optical transmission properties of a single subwavelength aperture in a real metal, Optics Communications, North-Holland Publishing Co., Amsterdam, NL, vol. 239, No. 1-3, Sep. 1, 2004, pp. 61-66.

Degiron A. et al., "The role of localized surface plasmon modes in the enhanced transmission of periodic subwavelength apertures", Journal of Optics A: Pure and Applied Optics, Institute of Physics Publishing, Bristol, GB, vol. 7, No. 2, Feb. 1, 2005, pp. S90-S96.

Van Nieuwstadt J.A.H. et al., "Strong modification of the nonlinear optical response of metallic subwavelength hole arrays", Physical Review Letters APS USA, vol. 97, No. 14, Oct. 6, 2006, pp. 146102-1 to 146102-4.

International Search Report and Written Opinion for PCT/EP2009/061673 dated Apr. 12, 2011 in 24 pages.

International Preliminary Examination Report on Patentability Chapter I for PCT/EP2009/061673 in 9 pages.

* cited by examiner

NANOSTRUCTURED SPECTRAL FILTER AND IMAGE SENSOR

TECHNICAL FIELD

The invention relates to a spectral filter, a matrix of spectral filters and an image sensor comprising such a matrix of filters, capable of operating in the visible field or in other ranges of wavelengths, for example in the field of infrared.

PRIOR ART

Image sensors, found especially in portable telephones or photo digital apparatus, are constituted principally by a matrix of photodetectors and focussing optics. This optic forms the image of an object on the matrix of photodetectors. To get colour images, it is known to align a network 20 of colour filters (illustrated in FIG. 1A) on the pixels of the sensor. This network 20 is matrixed according to a layout known as "Bayer" and is formed by a red filter 2, two green filters 4 and 6, and a blue filter 8 placed alongside the others in the form of a square matrix. The four photodetectors placed under these four filters 2, 4, 6 and 8 form four sub-pixels of a pixel 10 of the matrix of photodetectors. The colour of the image is reconstructed digitally from "mono-colour" signals received by the whole of pixels of the matrix of photodetectors. These filters are usually positioned a few micrometers above the photodetectors 12, electric interconnections 14 and layers of dielectric passivation 16, as illustrated in FIG. 1B.

In the field of consumer image sensors, this type of sensor is placed at the focal point of a lens of wide opening: the average angle of incidence of light beams on the sensor can vary from −25° to +25° between the two corners of the sensor and the angular opening on each pixel of the sensor is typically of the order of +/−10°. Each filter is illuminated at multiple incidences and optical polarisations. To conduct filtering of colours, it is preferable for the properties of the filters (transmission wavelength, transmission level, spectral width) to be constant, irrespective of the angle of incidence of the light.

Document US 2003/0103150 A1 describes a one-dimensional network of slots emerging in a metallic layer carrying out the function of colour filtering. With this geometry, calculations show that it is the slots which also ensure transmission of light beams filtered through the metallic layer. They also show that filtering is more selective when the slots have a width less than the wavelengths of visible light.

The particular disadvantage of this type of network is filtering only magnetic transverse polarisation of light. Also, the slots used in this network do not correctly match the filter in the range of visible wavelengths given the minimal spectral filtering width to be obtained with such a filter.

Another limitation is linked to the existence of electromagnetic modes at the surface of the metallic layer forming the network of slots, called surface plasmons. These electromagnetic modes can be excited during diffraction of incident light on the slots of the metallic layer. This excitation, selective in wavelength and in angle, degrades the function of band-pass filter made by the slots.

Document US 2003/0103150 A1 also describes a network of square holes made in a metallic layer. Such a network conducts filtering in the range of visible wavelengths. Yet, the filtered wavelengths are determined here as a function of the period of patterns, which makes this filtering highly dependent on the angle of incidence by which the light to be filtered arrives.

EXPLANATION OF THE INVENTION

An aim of the present invention is to propose a spectral filter whereof the transmission properties are constant irrespective of the angle of incidence of the light received and exhibiting a high photometric yield.

For this, a spectral filter is proposed, comprising at least one metallic layer structured by at least one hole, or a plurality of holes, passing through, or extending through, two opposite main faces of the metallic layer and comprising, in a plane parallel to a plane of one of the two main faces, a rectangular section whereof a first side has a dimension between around 40 nm and 100 nm, and whereof a second side, perpendicular to the first side, has a dimension between around 150 nm and 1000 nm.

This results in a polarising filter based on the individual electromagnetic response of the hole or holes formed in the metallic layer of the filter. Contrary to the solutions of the prior art, and due to the particular form of the hole of rectangular section whereof a first side has a dimension between around 40 nm and 100 nm, and whereof a second side, perpendicular to the first side, has a dimension between around 150 nm and 1000 nm, or between around 150 nm and 700 nm, or again between around 150 nm and 600 nm, the filter can be formed by a unique pattern, that is, a single hole made in the metallic layer. The minimum size of the pixel intended to cooperate with the filter is thus fixed by the size of the pattern. Also, all the filters of a matrix of filters can be joined together.

Also, such a filter avoids interactions between the filtering modes and the surface plasmons by dimensioning the size of the hole or, when the filter comprises a network of holes, the size of the holes, such that this interaction does not appear for the angles of incidences formed by the light which enters the filter.

Also, making such a rectangular hole is simplified relative to making a matrix of square holes.

The first side of the hole may have a dimension of between around 40 nm and 60 nm, and the second side of the hole may have a dimension of between around 150 nm and 250 nm. In this way, the filter is adapted to filter in the range of visible wavelengths, that is, between around 400 nm and 700 nm.

In a variant, the first side of the hole may have a dimension of between around 60 nm and 100 nm, and the second side of the hole may have a dimension of between around 250 nm and 1000 nm, or between 250 nm and 700 nm, or between 250 nm and 600 nm. In this way, the filter is adapted to filter in the range of infrared wavelengths, greater than around 700 nm, and especially those between around 700 nm and 2000 nm corresponding to close infrared filtering.

The invention especially relates to a spectral filter comprising at least one metallic layer structured by at least one hole passing through two opposite main faces of the metallic layer and comprising, in a plane parallel to a plane of one of the two main faces, a first rectangular section whereof a first side has a dimension between around 40 nm and 100 nm, and whereof a second side, perpendicular to the first side, has a dimension between around 150 nm and 1000 nm, and a second rectangular section centred relative to the first rectangular section, a first side of the second section being parallel to the second side of the first section and having a dimension between around 40 nm and 100 nm.

The structured metallic layer may be composed of aluminium and/or silver and/or gold, and/or may have a thickness of between around 30 nm and 500 nm. The thickness of the metallic layer may be between around 30 nm and 100 nm when the filter is adapted to filter visible wavelengths, or be between around 100 nm and 500 nm when the filter is adapted to filter infrared wavelengths.

When the filter comprises a plurality of holes passing through the metallic layer, said holes may be regularly spaced from one another, able to form a periodic network. In this way, it is possible to create a filtering surface of size greater than that obtained by a filter comprising a single hole.

The holes may be spaced from one another by at least a distance of between around 20 nm and 40 nm. The repetition period of the holes, corresponding to the sum of the dimension of the second side of a hole (corresponding to the larger dimension of the hole) and the space formed between two holes may thus be between around 170 nm and 1040 nm, or between around 170 nm and 290 nm for filtering in the range of visible wavelengths, and between 270 nm and 1040 nm for filtering in the range of infrared wavelengths. Such a repetition period gives angular stability compatible with the demands of imagers operating in the range of visible or infrared wavelengths. Using a repetition period of holes whereof the value is in this range avoids resonant excitation of surface plasmons which are highly sensitive angularly. The repetition period of the holes may also be between around 1.2 and twice the larger dimension of one of the holes.

In a variant, when the filter comprises a plurality of holes passing through the metallic layer, said holes may be spaced irregularly from each other, able to form an aperiodic network.

The hole, or at least part of the holes when the filter comprises a plurality of holes passing through the metallic layer, may comprise, in a plane parallel to a plane of one of the two main faces of the metallic layer, a second rectangular section centred relative to the rectangular section, called first section, a first side of the second section being parallel to the second side of the first section and having a dimension for example of between around 40 nm and 100 nm, and a second side of the second section being perpendicular to the second side of the first section and having a dimension for example of between around 150 nm and 1000 nm, or between around 150 nm and 700 nm, or between around 150 nm and 600 nm. Such a hole in cross form gives very fine optical performance (strong transmission and insensitivity to the angle of incidence formed by the light which enters the filter) at the same time exhibiting low sensitivity to polarisation.

Also, it is possible that the second side of the first or second section has a dimension less than or equal to around 100 nm. In this way, only one of the two polarisations is transmitted, for example magnetic transverse polarisation.

When the filter is adapted to filter in the range of visible wavelengths, the first side of the second section of the hole may have a dimension of between around 40 nm and 60 nm, and the second side of the second section of the hole may have a dimension of between around 150 nm and 250 nm.

In a variant, when the filter is adapted to filter in the range of infrared wavelengths, the first side of the second section of the hole may have a dimension of between around 60 nm and 100 nm, and the second side of the second section of the hole may have a dimension of between around 250 nm and 1000 nm, or between around 250 nm and 700 nm, or between around 250 nm and 600 nm.

The two rectangular sections of the hole may be centred relative to each other, that is, the first and the second rectangular sections have a common centre. In this way, the first and the second sections of the hole form a pattern in a cross form. In addition to the advantages contributed by the spectral filter whereof the hole or the holes comprises a single section of rectangular form, such a filter is non polarising and thus filters and transmits the polarised magnetic transverse and electric transverse modes, improving the photometric yield of the spectral filter.

The first sides of the first and of the second sections may have substantially similar dimensions and/or the second sides of the first and of the second sections may have substantially similar dimensions. In this way, this hole filters a single wavelength, corresponding for example to a colour in the range of visible wavelengths, for the two polarisations (magnetic transverse and transverse electric).

In a variant, the second section of the hole may have dimensions different to those of the first section of the hole that is, the dimensions of the first and/or of the second side of the second section may be different to the dimensions of the first and/or of the second side of the first section. In this way, with a single hole it is possible for example to filter a first colour in a polarisation, and filter a second colour in the other polarisation.

The hole or the holes may be filled at least in part by transparent dielectric or at least partially transparent material.

The invention also relates to a matrix of spectral filters comprising at least one plurality of spectral filters such as described earlier, at least two of the spectral filters being capable of filtering according to different wavelengths, or ranges of wavelengths, the dimensions of the first sides of the section or sections of at least one hole of a first of the two filters being substantially similar or different to the dimensions of the first sides of the section or sections of at least one hole of a second of the two filters, the dimensions of the second sides of the section or sections of the hole of the first of the two filters being different to the dimensions of the second sides of section the or sections of the hole of the second of the two filters.

The matrix of filters may comprise at least four spectral filters forming a Bayer filter.

The invention also relates to an image sensor comprising at least one matrix of spectral filters such as described earlier, and a matrix of photodetectors, each photodetector being placed opposite one of the spectral filters.

The matrix of photodetectors may be placed against a substrate, for example composed of a semi-conductor such as silicon, comprising reading and digital processing circuits, and/or having a thickness between around 100 nm (locally around the detection zone) and 500 nm in the case of a thinned substrate, or a thickness equal to around 500 μm when the substrate is not thinned (thus a thickness of between around 100 nm and 500 μm).

The sensor may also comprise a layer composed of at least one dielectric material placed between the matrix of spectral filters and the matrix of photodetectors, or between the matrix of photodetectors and a second substrate.

In this case, the layer composed of dielectric material may comprise a plurality of electric contacts connected to the photodetectors and/or to the reading circuits of the substrate and/or being composed of silicon nitride, and/or silicon oxide and/or of porous silicon.

The image sensor may also comprise a protective layer composed of at least one dielectric material, for example composed of polymer, placed against the matrix of filters.

In a variant, the matrix of spectral filters may be placed between two layers of a thickness of between around 10 nm and 500 nm, optical index n<1.6 or n<2, and composed of at least one dielectric material such as $SiO_2$, and/or SiOC, and/or nanoporous SiOC and/or nanoporous silica and/or a polymer. These two layers may be transparent or at least partially transparent in the field of wavelengths to be filtered. These two layers ensure angular stability of the filter by avoiding resonant excitation of surface plasmons on the metallic layer in which the spectral filters are made.

A production method of a spectral filter is also proposed, comprising at least the following steps:

structuring a dielectric layer, forming at least one dielectric portion enclosed by empty zones passing through two opposite main faces of the dielectric layer, the dielectric portion comprising, in a plane parallel to a plane of one of the two main faces, at least one rectangular section whereof a first side has a dimension between around 40 nm and 100 nm, and whereof a second side, perpendicular to the first side, has a dimension between around 150 nm and 1000 nm, or between around 150 nm and 700 nm, or between around 150 nm and 600 nm, depositing a metallic layer at least in the empty zones formed in the dielectric layer around the dielectric portion, planing of the metallic layer, deletion of the dielectric portion.

The invention also relates to a method for making a spectral filter, comprising at least the following steps:

structuring a dielectric layer, forming at least one dielectric portion enclosed by empty zones passing through two opposite main faces of the dielectric layer, the dielectric portion comprising, in a plane parallel to a plane of one of the two main faces, at least one first rectangular section whereof a first side has a dimension between around 40 nm and 100 nm, and whereof a second side, perpendicular to the first side, has a dimension between around 150 nm and 1000 nm, and a second rectangular section centred relative to the first rectangular section, a first side of the second section being parallel to the second side of the first section and having a dimension between around 40 nm and 100 nm, depositing a metallic layer at least in the empty zones formed in the dielectric layer around the dielectric portion, planing of the metallic layer (101), deletion of the dielectric portion.

Finally, a production method of a spectral filter is also proposed, comprising at least one etching step of a metallic layer according to a pattern comprising at least one hole passing through two opposite main faces of the metallic layer and comprising, in a plane parallel to a plane of one of the two main faces, a rectangular section whereof a first side has a dimension between around 40 nm and 100 nm, and whereof a second side, perpendicular to the first side, has a dimension between around 150 nm and 1000 nm, or between around 150 nm and 700 nm, or between around 150 nm and 600 nm.

The invention also relates to a production method of a spectral filter, comprising at least one etching step of a metallic layer according to a pattern comprising at least one hole passing through two opposite main faces of the metallic layer and comprising, in a plane parallel to a plane of one of the two main faces, a first rectangular section whereof a first side has a dimension between around 40 nm and 100 nm, and whereof a second side, perpendicular to the first side, has a dimension between around 150 nm and 1000 nm, and a second rectangular section centred relative to the first rectangular section, a first side of the second section being parallel to the second side of the first section and having a dimension between around 40 nm and 100 nm.

A second side of the second section may be perpendicular to the second side of the first section and may have a dimension between around 150 nm and 1000 nm.

The dimensions of the first and/or of the second side of the second section may be different to the dimensions of the first and/or of the second side of the first section.

BRIEF DESCRIPTION OF THE DIAGRAMS

Figure 1B:
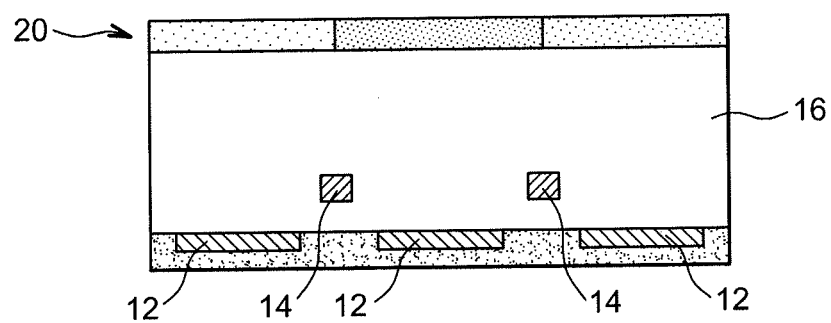
Figure 2A:
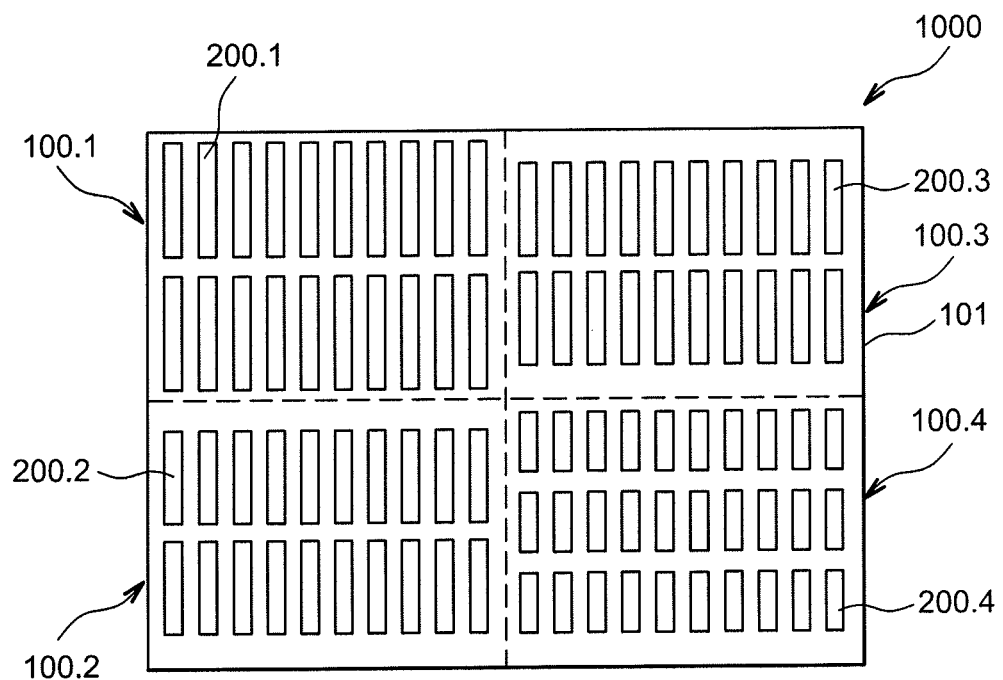
Figure 2A:
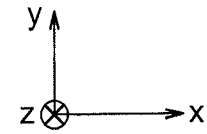
Figure 2B:
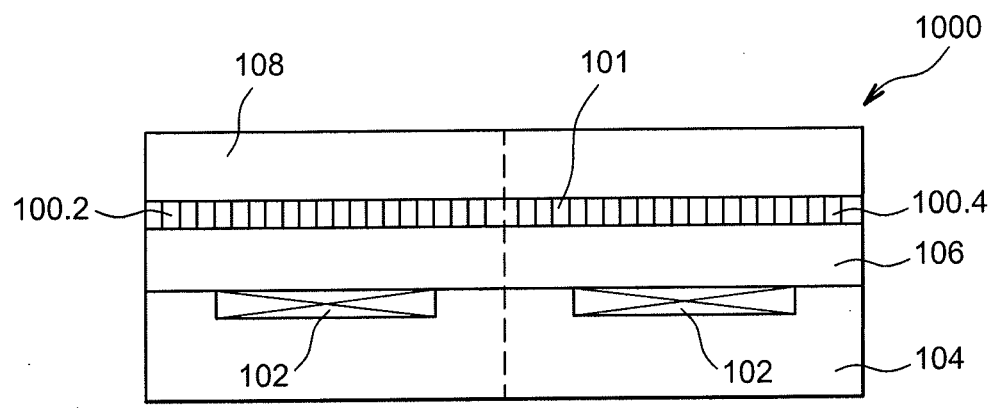
Figure 2B:
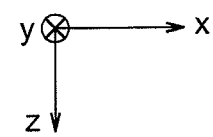
Figure 3A:
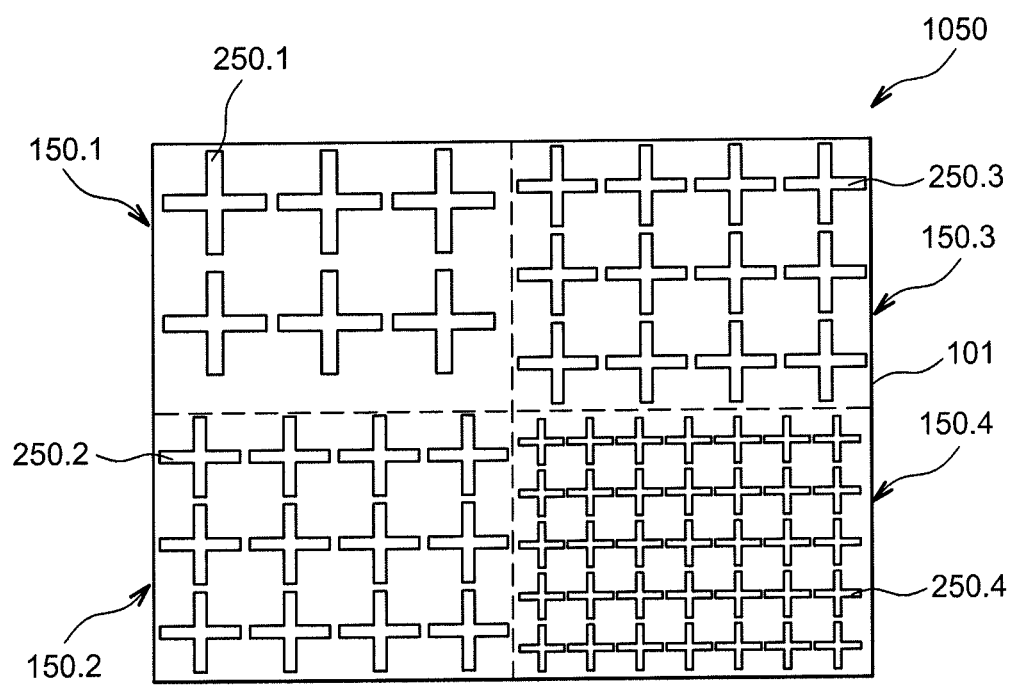
Figure 3B:
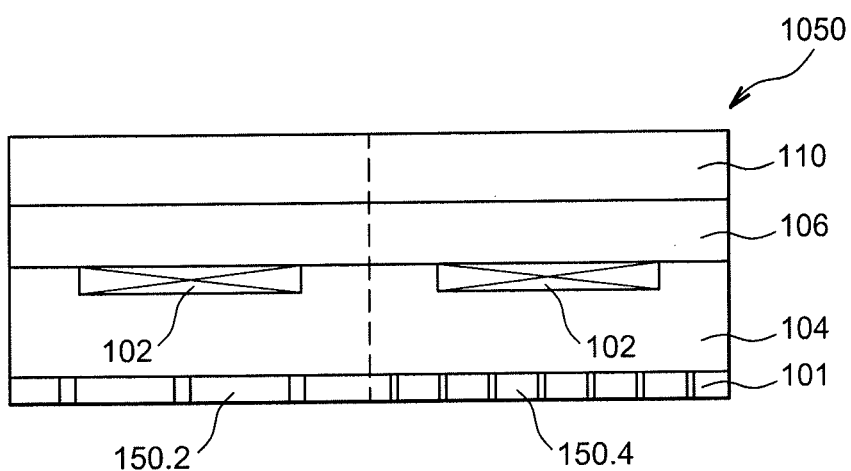
Figure 3C:
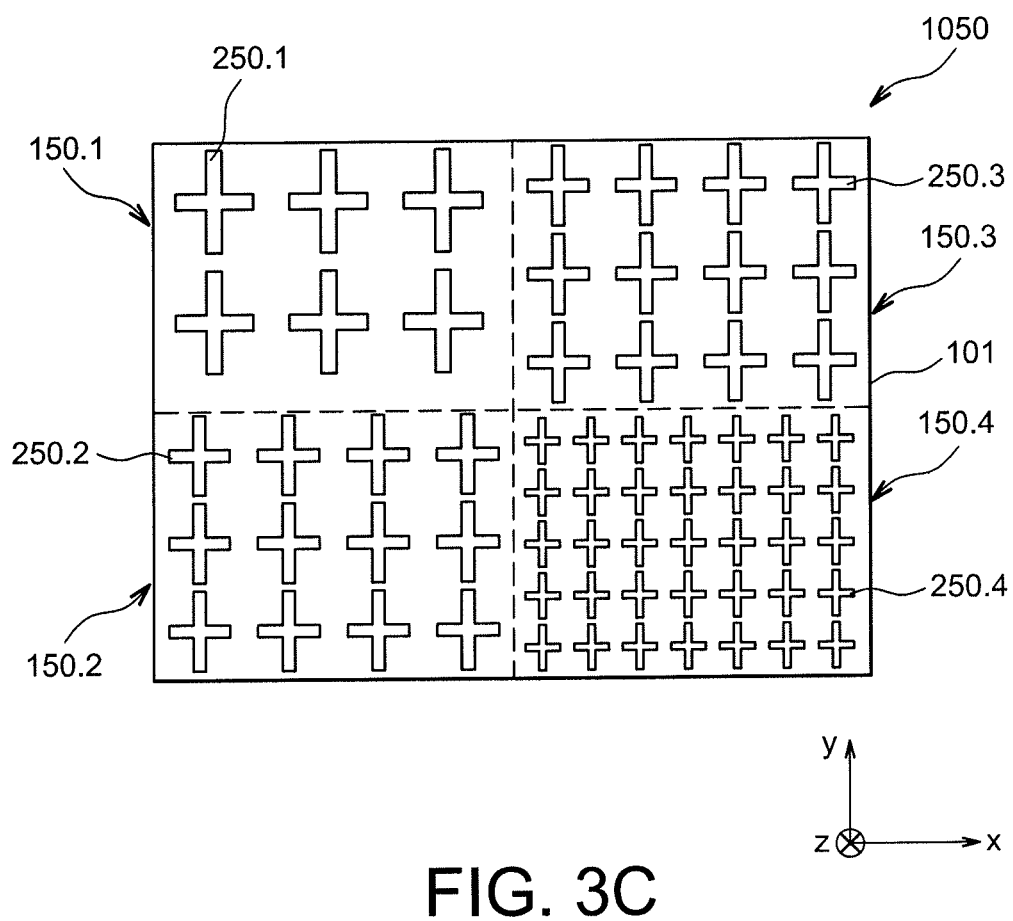
Figure 4:
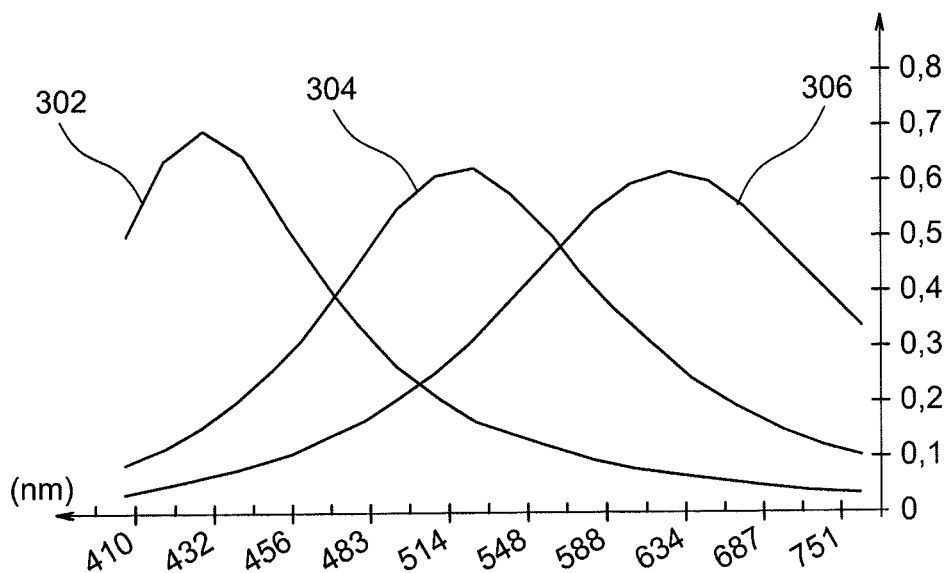
Figure 5:
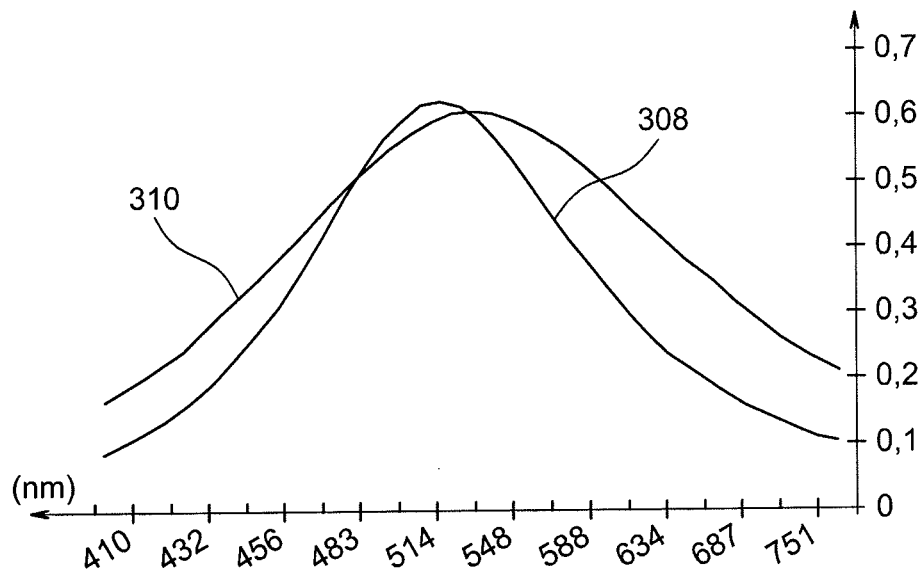
Figure 6:
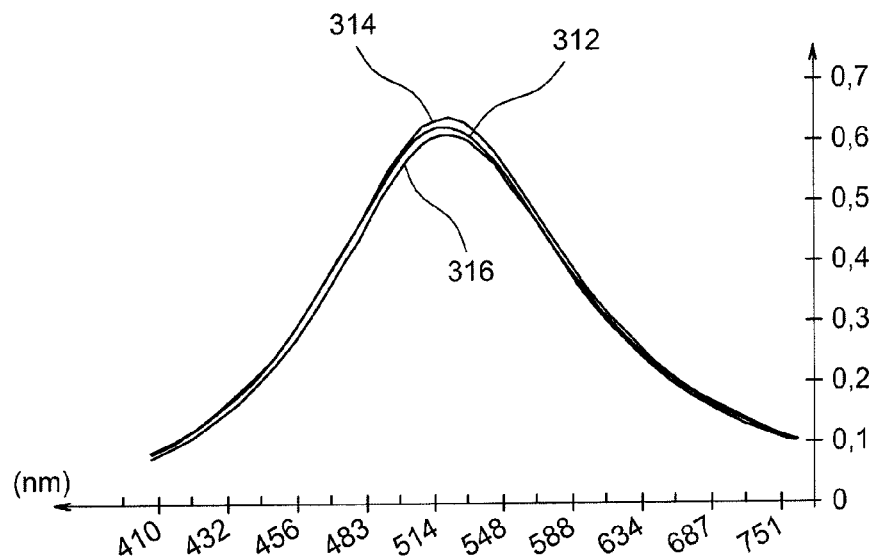
Figure 7:
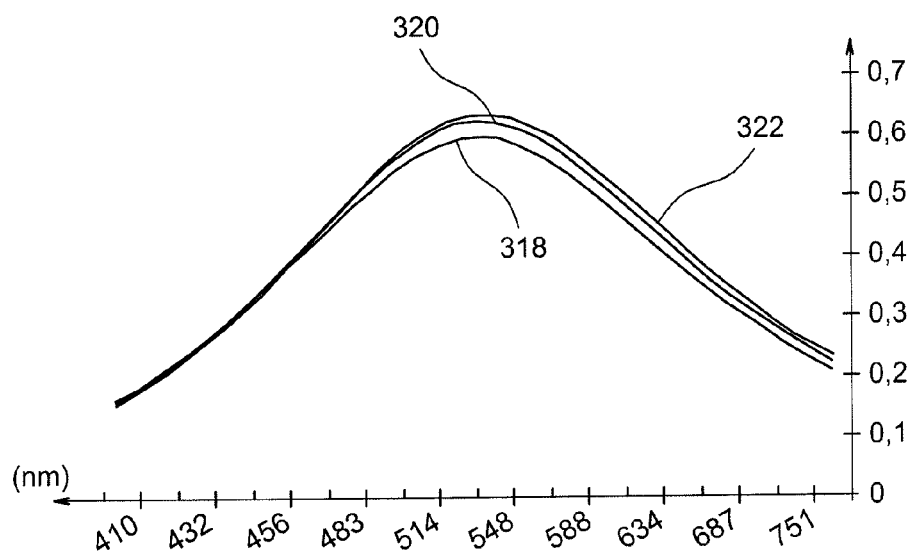

The present invention will be better understood from the description of embodiments given purely by way of indication and non-limiting in reference to the attached diagrams, in which:

FIG. 1A illustrates a network of colour filters according to a Bayer layout, FIG. 1B illustrates a network of colour filters placed above photodetectors, FIGS. 2A and 2B illustrate respectively a top cross-section view and a side cross-section view of part of an image sensor according to a first embodiment, FIGS. 3A to 3C illustrate respectively a top cross-section view and a side cross-section view of part of an image sensor, object of the present invention, according to a second embodiment and a variant of the second embodiment, FIG. 4 illustrates simulation curves of transmissions by spectral filters, subject matter of the present invention, comprising holes in a cross shape of different dimensions, FIG. 5 illustrates simulation curves of transmissions of a filter made in a layer of aluminium of 40 nm of a thickness pierced by a single hole in a cross shape or by a network of holes in a cross shape, FIG. 6 illustrates transmission curves of a filter made in a layer of aluminium of a thickness of 40 nm pierced by a single hole in a cross shape for light arriving at the filter with several incident angles, FIG. 7 illustrates transmission curves of a filter made in a layer of aluminium of a thickness of 40 nm pierced by several holes in a cross shape for light arriving at the filter with several incident angles.

Identical, similar or equivalent parts of the different figures described hereinbelow bear the same digital references for easy referencing of all figures.

The different parts illustrated in the figures are not necessarily different according to a uniform scale, to make figures more legible.

The different possibilities (variants and embodiments) must be understood as not being exclusive to one another and can be combined together.

DETAILED EXPLANATION OF PARTICULAR EMBODIMENTS

Reference is made to FIGS. 2A and 2B which illustrate respectively a top cross-section view and a side cross-section view of part of an image sensor 1000 according to a first embodiment.

This image sensor 1000 comprises a plurality of pixels. In FIGS. 2A and 2B, a single one of these pixels is illustrated. Each pixel comprises a matrix of filters 100.1 to 100.4, whereof distribution, as a function of filtered wavelengths, corresponds to the distribution of a Bayer filter. The matrix of filters 100.1 to 100.4 is made in a structured metallic layer 101 which is placed above a matrix of photodetectors 102. Each pixel of the sensor 1000 is thus formed by four sub-pixels each comprising one of the filters 100.1 to 100.4 capable of filtering in a given range of wavelengths (corresponding here to filtering of one of the colours red, green or blue) and a photodetector 102.

The metal or the metals from which the metallic layer 101 is made are selected so that the metallic layer 101 is the least absorbent possible in the range of wavelengths transmitted, so as to maximise light transmission of the filters 100.1 to 100.4 in the preferred ranges of wavelengths. When the filters 100.1 to 100.4 are intended to filter wavelengths in the visible field, as is the case in this first embodiment, the metallic layer 101 is composed of aluminium, and/or silver, and/or gold, or any other adapted metal. But, as a function of the wavelengths to be filtered by the filters, it is possible for the metallic layer 101 to be composed of other materials, especially for wavelengths greater than those of the visible field. The thickness of the metallic layer 101 also influences the transmission made by the filters formed in this layer. In general, the metallic layer 101 may have a thickness of between around 50 nm and a few hundreds of nm, for example 500 nm. This thickness is selected as a function of the wavelengths to be transmitted, the preferred selectivity of the filter and the nature of the other materials of the filters 100.1 to 100.4.

Each of the filters 100.1 to 100.4 comprises a plurality of holes 200.1 to 200.4 passing through the metallic layer 101 and regularly distributed over in this metallic layer 101. Each of the holes 200.1 to 200.4, in a plane parallel to the plane (x,y) corresponding to the plane of one of the main faces of the metallic layer 101, has a section of rectangular form.

In this first embodiment, the dimensions of the sides of the rectangular sections of the holes 200.1 to 200.4 according to the axis x illustrated in FIG. 2A are substantially similar to each other and are for example equal to around 60 nm. In general, the dimensions of the sides of the rectangular sections of the holes 200.1 to 200.4 according to the axis x could be between around 40 nm and 60 nm in the case of an image sensor 1000 operating in the range of visible wavelengths, or between around 60 nm and 100 nm in the case of an image sensor 1000 operating in the range of infrared wavelengths.

On the other hand, the dimensions of the sides of these sections according to the axis y differ from one filter to the other, and may be between around 150 nm and 250 nm. In this way, each of the filters 100.1 to 100.4 can filter a particular range of wavelengths, this range being determined by the dimension of the sides of the rectangular sections of the holes according to the axis y. In the example of FIGS. 2A and 2B, the filter 100.1 lets in only wavelengths of between around 620 nm and 700 nm, corresponding to the colour red. For this, the holes 200.1 have their sides according to the axis y of dimension equal to around 240 nm. The filters 100.2 and 100.3 let in only the wavelengths of between around 500 nm and 578 nm, corresponding to the colour green. For this, the holes 200.2 and 200.3 have their sides according to the axis y of dimension equal to around 200 nm. Finally, the filter 100.4 lets in only wavelengths of between around 446 nm and 500 nm, corresponding to the colour blue. For this, the holes 200.4 have their sides according to the axis y of dimension equal to around 150 nm.

The dimensions of the sides of the rectangular sections of the holes 200.1 to 200.4 according to the axis y could be between around 150 nm and 250 nm in the case of an image sensor 1000 operating in the range of visible wavelengths, or between around 250 nm and 1000 nm in the case of an image sensor 1000 operating in the range of infrared wavelengths.

The holes 200.1 to 200.4 are here filled by dielectric material, for example $SiO_2$, and/or SiOC, and/or nanoporous SiOC and/or nanoporous silica and/or a polymer. This dielectric material is transparent to wavelengths which are intended to be transmitted by the filters 100.1 to 100.4. The refraction index of the dielectric material may preferably be less than 1.6, thus ensuring the angular stability of the filters 100.1 to 100.4, avoiding resonant excitation of surface plasmons on the metallic layer 101.

The matrix of photodetectors 102 is made on a substrate 104, for example composed of semi-conductor such as silicon, and/or GaS, and/or CdHgTe, which may integrate reading and digital processing circuits of output signals from the photodetectors 102. The matrix of filters 100.1 to 100.4 is separated from the matrix of photodetectors 102 by a "support" layer 106, for example composed of at least one dielectric such as silicon nitride and/or oxide of porous silicon or not. This support layer 106 mechanically supports the matrix of filters 100.1 to 100.4, but can also concentrate incident beams on the photodetectors 102 and/or the influence of electric contacts on the photodetectors 102 and/or insulation and passivation of the matrix of photodetectors 102.

The matrix of filters 100.1 to 100.4 is covered by a layer of "protection" 108, for example composed of polymer materials, and/or silicon oxide, and/or silica, and/or $SiO_X$, and/or $Si_XN_Y$, and/or silicon, acting as chemical and mechanical protection of the matrix of filters 100.1 to 100.4 and/or making a concentration of light beams on the photodetectors 102.

In this first embodiment, the light to be detected first passes through the protective layer 108, then is filtered by the matrix of filters 100.1 to 100.4, next passes through the support layer 106 to finally arrive at the matrix of photodetectors 102. The materials of these elements of the sensor 1000 passed through by light to be detected are selected at least partially transparent or totally transparent to wavelengths to be transmitted.

Reference is now made to FIGS. 3A and 3B which illustrate respectively a top cross-section view and a side cross-section view of part of an image sensor 1050 according to a second embodiment.

As in the first embodiment, the sensor 1050 comprises a plurality of pixels, each pixel comprising a matrix of four filters 150.1 to 150.4 forming a Bayer filter and made in a metallic layer 101, for example of a nature similar to that used in the first embodiment.

Each of the filters 150.1 to 150.4 comprises a plurality of holes 250.1 to 250.4 passing through the metallic layer 101 and regularly distributed over this metallic layer 101. Each of the holes 250.1 to 250.4 has, in a plane parallel to the plane (x,y) corresponding to the plane of one of the main faces of the metallic layer 101, a first rectangular section whereof a first side (dimension according to the axis x) has a dimension between around 40 nm and 60 nm, or between 60 nm and 100 nm in the case of an infrared sensor, and a second side (dimension according to the axis y), perpendicular to the first side, has a dimension between around 150 nm and 250 nm, or between around 250 nm and 1000 nm in the case of an infrared sensor. In this same plane, each of the holes 250.1 to 250.4 also comprises a second rectangular section centred relative to the first rectangular section. A first side of the second section, parallel to the second side of the first section (that is, parallel to the axis y), has a dimension of between around 40 nm and 60 nm, or between around 60 nm and 100 nm, and a second side of the second section, perpendicular to the second side of the first section (that is, parallel to the axis x), has a dimension between around 150 nm and 250 nm, or between around 250 nm and 1000 nm. Each of the holes 250.1 to 250.4 comprises in said plane a section in a cross shape, each cross being formed by the crossing of a first rectangular section and a second rectangular section.

In this second embodiment, the dimensions of the first and second sides of the first and second sections of the holes forming the cross differ from one filter to the other. In a variant, it is possible that the dimensions of the first sides of the first and second sections are similar for the four filters 150.1 to 150.4. In this case, the choice of ranges of filtered wavelengths depends on the choice of the dimensions of the second sides of the first and second sections, which are different from one filter to the other. These dimensions of the second sides of the first and second sections may for example be similar to those of the second sides described earlier in the first embodiment.

As in the first embodiment, the holes 250.1 to 250.4 are filled by a dielectric material, for example similar to that described earlier in conjunction with the first embodiment.

The matrix of photodetectors 102 of the sensor 1050 is made here on a substrate 104, for example composed of silicon, and covered by a support layer 106 for example similar to that described earlier in conjunction with the first embodiment. This stacking is transferred on a second substrate 110, effectively thinning the first substrate 104, for example by mechanical-chemical polishing. The filters 150.1 to 150.4 are then made in the metallic layer 101 which is placed against the thinned substrate 104.

In this second embodiment, the light to be detected is first filtered by the matrix of filters 150.1 to 150.4, and then passes through the substrate 104 to finally arrive at the matrix of photodetectors 102. The planing of the substrate 104 limits absorption of incident light by the material constituting the substrate 104.

In a variant of the two embodiments described earlier, the metallic layer 101 comprising the filters may be advantageously placed between two dielectric layers, for example thin layers of a thickness between around 10 nm to 500 nm, with low optical index, for example less than 2 or less than 1.6, and composed of $SiO_2$, and/or SiOC, and/or nanoporous SiOC and/or nanoporous silica and/or polymer. In this way, these two dielectric layers are transparent or at least partially transparent in the field of wavelengths to be detected and ensure a certain angular stability of the filter by avoiding excitation of surface plasmons of the metallic layer 101.

These two dielectric layers may also have structurings, especially for reducing their average transmission index. These structurings may be similar or not to those of the metallic layer 101, that is, to the rectangular holes or in a cross shape made in the metallic layer 101. These structurings made in the dielectric layers may be emerging, that is, made through the entire thickness of one or both dielectric layers, or not. These structurings may also be for example holes of rectangular section or in a cross shape, whereof the dimensions and/or the spacing differ relative to the holes made in the metallic layer 101. Finally, these structurings of these two dielectric layers may be different from one photodetector to the other.

Each of the spectral filters 100.1 to 100.4 and 150.1 to 150.4 of the two embodiments described earlier comprise a plurality of holes regularly spaced from one another, that is, placed in a network. But each of these spectral filters may comprise only a single hole, given that the phenomenon of filtering is based on an individual response of the holes. In another embodiment, each of the filters may comprise a plurality of holes placed in an aperiodic network, that is, spaced irregularly from each other.

FIG. 3C illustrates a top cross-section view of part of the image sensor 1050 according to a variant of the second embodiment.

Relative to the image sensor 1050 illustrated in FIG. 3A, the image sensor 1050 illustrated in this FIG. 3C comprises spectral filters 150.1-150.4 all comprising holes 250.1-250.4 forming asymmetrical crosses. Each of the holes 250.1 to 250.4 has, in a plane parallel to the plane (x,y) corresponding to the plane of one of the main faces of the metallic layer 101, a first rectangular section whereof a first side (dimension according to the axis x) has a dimension between around 40 nm and 60 nm, or between 60 nm and 100 nm in the case of an infrared sensor, and a second side (dimension according to the axis y), perpendicular to the first side, has a dimension between around 150 nm and 250 nm, or between around 250 nm and 1000 nm in the case of an infrared sensor. Each of the holes 250.1 to 250.4 also comprises in this same plane a second rectangular section centred relative to the first rectangular section. A first side of the second section, parallel to the second side of the first section (that is, parallel to the axis y), has a dimension between around 40 nm and 60 nm, or between around 60 nm and 100 nm, and a second side of the second section, perpendicular to the second side of the first section (that is, parallel to the axis x), has a dimension of between around 150 nm and 250 nm, or between around 250 nm and 1000 nm. Yet, for each hole, the dimensions of the second side of the second section are different here to the dimensions of the second side of the first section. In this way, and with a single hole, it is possible to carry out filtering of a first wavelength in a polarisation (for example, magnetic transverse polarisation), and filtering of a second wavelength in the other polarisation (electric transverse polarisation).

Also, when the second side of the first or of the second section has a dimension less than or equal to around 100 nm, only one of the two polarisations is transmitted, for example the magnetic transverse polarisation.

FIG. 4 illustrates the transmission made by three spectral filters each comprising a single hole in a cross shape made in a layer of aluminium of a thickness equal to around 40 nm. The curves 302, 304 and 306 illustrate the standardised value of the transmission as a function of the wavelength for each of the three filters. The dimensions of the first sides of the first and second sections of the holes of the three filters are equal to 60 nm. The dimensions of the second sides of the first and second sections of the holes are equal to 150 nm, 200 nm and 240 nm for the filters corresponding respectively to the curves 302, 304 and 306. It is evident that the choice of dimensions of the second sides of the first and second sections of the holes selects the range of wavelengths to be filtered, corresponding here to the colours red, green and blue. In comparison to a rectangular hole, the transmissions obtained in TE and TM polarisation for a hole in a cross shape are identical to normal incidence. In this way, for filtering a beam of non-polarised light, a filter comprising a hole in a cross shape produces better gain in transmission.

As in the two embodiments described earlier, each filter may comprise several holes placed in networks. The curves 308 and 310 illustrated in FIG. 5 illustrate simulation of the transmission of a filter made in a layer of aluminium of a thickness of 40 nm, respectively pierced by a single hole in a cross shape and by a network of holes in a cross shape, the dimension of the first sides of the sections of the holes being equal to around 60 nm and the dimension of the second sides of the sections of the holes being equal to around 200 nm. The network of holes is square in shape, such as for example for the filters illustrated in FIGS. 2A and 3A, and the period of this network is equal to around 250 nm. In comparing the curves 308 and 310, we can see that using a network of holes rather than a single hole causes slight offsetting of transmission to larger wavelengths as well as spectral widening of resonance. A slight variation in the dimensions of the first sides of the first and second sections of the holes does however compensate these effects due to the optical interaction between the holes and may be taken into account during dimensioning of the holes.

Using a pattern in a cross shape gives a filter whereof the angular performance is highly stable, at the same time for a filter comprising a single hole or a plurality of holes placed in network. The curves 312, 314 and 316 of FIG. 6 illustrate the dependence on transmission of a filter made in a layer of aluminium of 40 nm of a thickness pierced by a single hole in a cross shape whereof the dimension of the first sides of the sections is equal to around 60 nm and the dimension of the second sides of the sections is equal to around 200 nm, as a function of the angle of incidence of the light. The curves 312, 314 and 316 illustrate the value of the coefficients of transmission for a light arriving at the filter at an angle respectively equal to 0°, 5° and 15°. These curves observe that for an angle of incidence equal to 15°, transmissions TE and TM move away only slightly from the transmission calculated at zero incidence. The curves 318, 320 and 322 of FIG. 7 illustrate this same dependence on the transmission of the filter as a function of an angle of incidence respectively equal to 0°, 5° and 15°, for a filter comprising a network of holes similar to the hole used for the simulations illustrated in FIG. 6, and whereof the repetition period is equal to around 250 nm.

The invention claimed is:

1. A spectral filter comprising at least one metallic layer structured by at least one hole passing through two opposite main faces of the metallic layer and comprising, in a plane parallel to a plane of one of the two main faces, a first rectangular section such that a first side has a dimension between 40 nm and 100 nm, wherein a second side, perpendicular to the first side, has a dimension between 150 nm and 1000 nm, and a second rectangular section centred relative to the first rectangular section, and wherein a first side of the second rectangular section is parallel to the second side of the first rectangular section and has a dimension between 40 nm and 100 nm, wherein at least one of:
the dimensions of the first side of the second rectangular section are different than the dimensions of the first side of the first rectangular section, and
the dimensions of the second side of the second rectangular section are different than the dimensions of the second side of the first rectangular section.

2. The spectral filter according to claim 1, wherein the structured metallic layer is composed of aluminium and/or silver and/or gold, and has a thickness of between 30 nm and 500 nm.

3. The spectral filter according to claim 1 wherein when the filter comprises a plurality of holes passing through the metallic layer, the plurality of holes are regularly spaced from one another.

4. The spectral filter according to claim 3, in which the holes are spaced one from another according to a period of between 170 nm and 1040 nm.

5. The spectral filter according to claim 1, in which a second side of the second rectangular section is perpendicular to the second side of the first rectangular section and has a dimension between 150 nm and 1000 nm.

6. The spectral filter according to claim 5, in which the first sides of the first and of the second rectangular sections have substantially similar dimensions or the second sides of the first and of the second rectangular sections have substantially similar dimensions.

7. The spectral filter according to claim 1, in which the at least one hole is filled at least in part by an at least partially transparent dielectric material.

8. The spectral filter according to claim 1, wherein:
the dimensions of the first side of the second rectangular section are different than the dimensions of the first side of the first rectangular section, and
the dimensions of the second side of the second rectangular section are different than the dimensions of the second side of the first rectangular section.

9. A matrix of spectral filters comprising at least one plurality of spectral filters according to claim 1, at least two of the spectral filters being capable of carrying out filtering according to different wavelengths, or ranges of wavelengths, the dimensions of the first sides of the sections of at least one hole of a first of the two filters being substantially similar or different to the dimensions of the first sides of the sections of at least one hole of a second of the two filters, the dimensions of the second sides of the sections of the hole of the first of the two filters being different to the dimensions of the second sides of the sections of the hole of the second of the two filters.

10. The matrix of spectral filters according to claim 9, comprising at least four spectral filters forming a Bayer filter.

11. An image sensor comprising at least one matrix of spectral filters according to claim 9, and a matrix of photodetectors, each photodetector being placed opposite one of the spectral filters.

12. The image sensor according to claim 11, in which the matrix of photodetectors is placed against a substrate comprising reading and digital processing circuits and/or having a thickness between 100 nm and 500 µm.

13. The image sensor according to claim 11, further comprising a layer composed of at least one dielectric material placed between the matrix of spectral filters and the matrix of photodetectors, or between the matrix of photodetectors and a second substrate.

14. The image sensor according to claim 13, in which the layer composed of a dielectric material comprises a plurality of electric contacts connected to the photodetectors and/or to the reading circuits of the substrate and is composed of silicon nitride and/or silicon oxide and/or porous silicon.

15. The image sensor according to claim 11, further comprising a protective layer composed of at least one dielectric material placed against the matrix of filters, or in which the matrix of filters is placed between two layers composed of at least one dielectric material, of a thickness between 10 nm and 500 nm, and optical index n<1.6.

16. A method for producing a spectral filter, comprising at least the following steps:
structuring a dielectric layer;
forming at least one dielectric portion enclosed by empty zones passing through two opposite main faces of the dielectric layer, the dielectric portion comprising, in a plane parallel to a plane of one of the two main faces, at least one first rectangular section wherein a first side has a dimension between 40 nm and 100 nm, and wherein a second side, perpendicular to the first side, has a dimension between 150 nm and 1000 nm, and a second rectangular section centred relative to the first rectangular section, a first side of the second rectangular section being parallel to the second side of the first rectangular section and having a dimension between 40 nm and 100 nm, wherein at least one of:
the dimensions of the first side of the second rectangular section are different than the dimensions of the first side of the first rectangular section, and
the dimensions of the second side of the second rectangular section are different than the dimensions of the second side of the first rectangular section,
depositing a metallic layer at least in the empty zones formed in the dielectric layer around the dielectric portion,
planarizing the metallic layer; and
removing the dielectric portion.

17. The method according to one of claim 16, wherein a second side of the second rectangular section is perpendicular to the second side of the first rectangular section and has a dimension between 150 nm and 1000 nm.

18. A method for producing a spectral filter, comprising at least one etching step of a metallic layer according to a pattern comprising at least one hole passing through two opposite main faces of the metallic layer, the hole comprising, in a plane parallel to a plane of one of the two main faces, a first rectangular section wherein a first side has a dimension between 40 nm and 100 nm, and wherein a second side, perpendicular to the first side, has a dimension between 150 nm and 1000 nm, and a second rectangular section centred relative to the first rectangular section, a first side of the second rectangular section being parallel to the second side of the first rectangular section and having a dimension between 40 nm and 100 nm, wherein at least one of:
- the dimensions of the first side of the second rectangular section are different than the dimensions of the first side of the first rectangular section, and
- the dimensions of the second side of the second rectangular section are different than the dimensions of the second side of the first rectangular section.

* * * * *

UNITED STATES PATENT AND TRADEMARK OFFICE
CERTIFICATE OF CORRECTION

| | |
|---|---|
| PATENT NO. | : 9,122,007 B2 |
| APPLICATION NO. | : 13/061935 |
| DATED | : September 1, 2015 |
| INVENTOR(S) | : Alexandre Mary et al. |

It is certified that error appears in the above-identified patent and that said Letters Patent is hereby corrected as shown below:

In the specification

In column 4 at line 32, Change "section the or" to --the section or--.

In the claims

In column 12 at line 66, In Claim 17, change "The method according to one of claim" to --The method according to claim--.

Signed and Sealed this
Nineteenth Day of April, 2016

Michelle K. Lee
*Director of the United States Patent and Trademark Office*